US006188893B1

United States Patent
Lechner et al.

(10) Patent No.: US 6,188,893 B1
(45) Date of Patent: Feb. 13, 2001

(54) SUBSCRIBER CONNECTION NET FOR THE CONNECTION OF SUBSCRIBER STATIONS TO AN EXCHANGE USING A RADIO SYSTEM

(75) Inventors: Robert Lechner, Böheimkirchen; Volker Rogasch, Greifswald, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/091,174

(22) PCT Filed: Dec. 5, 1996

(86) PCT No.: PCT/DE96/02326

§ 371 Date: Jun. 9, 1998

§ 102(e) Date: Jun. 9, 1998

(87) PCT Pub. No.: WO97/23106

PCT Pub. Date: Jun. 26, 1997

(30) Foreign Application Priority Data

Dec. 15, 1995 (DE) ............................................. 195 47 020

(51) Int. Cl.[7] .................................................. H04Q 7/20
(52) U.S. Cl. .......................... 455/422; 455/423; 455/424
(58) Field of Search .................................. 455/560, 561, 455/524, 445

(56) References Cited

U.S. PATENT DOCUMENTS

| | | | |
|---|---|---|---|
| 4,180,708 | * 12/1979 | Yamaguchi et al. ............... | 179/2 EB |
| 4,939,785 | * 7/1990 | Murata et al. ........................ | 455/54 |
| 5,084,869 | * 1/1992 | Russell ............................... | 370/85.7 |
| 5,134,645 | * 7/1992 | Berken et al. ....................... | 379/58 |
| 5,590,176 | * 12/1996 | Agarwal et al. ..................... | 379/59 |
| 5,598,412 | * 1/1997 | Griffith et al. ..................... | 370/352 |
| 5,603,086 | * 2/1997 | Cree et al. .......................... | 455/34.1 |
| 5,625,866 | * 4/1997 | Lidbrink et al. ..................... | 455/8 |
| 5,758,285 | * 5/1998 | Chavez, Jr. et al. ................ | 455/445 |

FOREIGN PATENT DOCUMENTS

| | | | |
|---|---|---|---|
| 0 293 014 | 11/1988 | (EP) | ............... H04Q/7/04 |
| 0 473 355 | * 3/1992 | (EP) | ............... H04Q/7/02 |
| 0 624 995 | 11/1994 | (EP) | ............... H04Q/7/04 |

OTHER PUBLICATIONS

Ericsson Review, No. 2, (1994), Guy M. Campbell et al, DCT 1800—A DECT Solution for Radio Access Application, pp. 84–92.

* cited by examiner

Primary Examiner—Daniel S. Hunter
Assistant Examiner—Meless Zewdu
(74) Attorney, Agent, or Firm—Schiff Hardin & Waite

(57) ABSTRACT

The radio control unit (RDU) which is near to the switching office and which is connected via a transmission link (UT) to radio base stations (RBS) near the subscriber is divided into a plurality of switching office-side interfaces (LEIM) conceived as a downtime unit and subscriber-side interfaces (RBIM) which have multiple access to one another in various ways via a multiple bus system. The subscriber connection data are distributed over the databases of the interfaces (RBIM, LEIM). There is good insensitivity to failures with a low level of expenditure on hardware and development.

2 Claims, 2 Drawing Sheets

SUBSCRIBER CONNECTION NET FOR THE CONNECTION OF SUBSCRIBER STATIONS TO AN EXCHANGE USING A RADIO SYSTEM

BACKGROUND OF THE INVENTION

The invention relates to a subscriber connection network for connecting subscriber stations to a telecommunications switching office, which network comprises a radio system for establishing the connections.

Accordingly, a radio system is required whose air interface is between fixed subscriber connection units for subscriber terminals or mobile subscriber terminals and radio base stations which are each configured to serve a plurality of subscriber terminals and are connected via a transmission link to radio control units which are near to the switching office.

The connection of a subscriber terminal to the switching office can be established here optionally via at least two of the radio base stations. In addition, it is possible for a changeover to another radio base station without interruption during an existing connection.

Communications systems quite generally, and accordingly such a subscriber connection system, require that the failure of a function unit must lead to the failure of a communications facility or to the interruption of active connections for only a specific number of subscribers. In practice, this may be, for example, 64 subscribers. A further requirement consists in the fact that such a failure of a function unit must entail only a specific level of traffic losses which it is to be possible for the operator to define within certain limits.

The aforesaid requirements are, on the other hand, to be fulfilled with the lowest possible expenditure on manufacture and development. A concept with redundant function units or a large number of small function units which serve only a small number of subscribers is subject to limits owing to the manufacturing costs. The possibility of equivalent circuitry to maintain existing connections in the event of the failure of a function unit is, if a relatively large number of connections will be affected, possible only with high development costs.

In a known subscriber connection network of the abovementioned type, for which the terms RLL (Radio Local Loop) or RITL (Radio In The Loop) are also used, every subscriber has optional access to any base stations and, furthermore, it is possible, in the course of an existing connection, to change over without interruption from one base station to another if the quality of the radio connection has diminished (Ericsson Review 2, 1994, A DECT Solution For Radio Access Application). In this known subscriber connection network there are transmission links for 2 Mbit/s signals between a central device of the radio system and the telecommunications switching office. The failure of one of the transmission links leads to a total failure of the subscriber stations which can be reached via it.

SUMMARY OF THE INVENTION

The object of the invention consists in configuring a subscriber connection network, in such a way that in terms of the abovementioned aspects, namely the lowest possible development and manufacturing expenditure, total failures are limited to, at most, prescribed numbers of subscriber stations and it is also possible, to a certain extent, to save existing connections when function units fail.

According to the present invention, at least one interface unit, conceived as a downtime unit, for connecting a connection line which leads to the telecommunications switching office and whose database contains the subscriber data is provided as a component of the radio control units. In addition, on the subscriber side, at least two interface units are provided for connecting a transmission link which connects to a radio base station and whose database contains the data of the respective radio base stations. In addition, an interface unit for connecting a system for operational and maintenance tasks is provided, from which system, inter alia, subscriber data and/or data of the radio base stations are input into the database of the aforesaid database units. Finally, a multiple bus system for connecting the interface units to whose individual bus systems the interface units have access to differing degrees is provided as a further component of the radio control units.

Owing to the configuration according to the invention, the failure of an switching office-side interface can lead only to the loss of the connections routed via it, which, however, meets the requirements relating to the upper limit in the case of a total failure since these interface units are conceived as a downtime unit.

In the event of a failure of a subscriber-side interface unit or the transmission link connecting the latter to a radio base station, which is a fault situation which is to be expected significantly more frequently than the failure of an switching office-side interface unit, there continues to be the possibility of a connection setup for all the subscribers, even if with a reduced level of traffic quality. Here, it is neither necessary to provide redundancy nor to set up a so-called hot standby mode in order to save existing connections, which also makes the solution according to the invention correspondingly cost-effective.

In an advantageous functional distribution of procedures during the connection setup owing to an outgoing seizure and an incoming seizure distribution leads to a relatively simple structure of the interface units.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
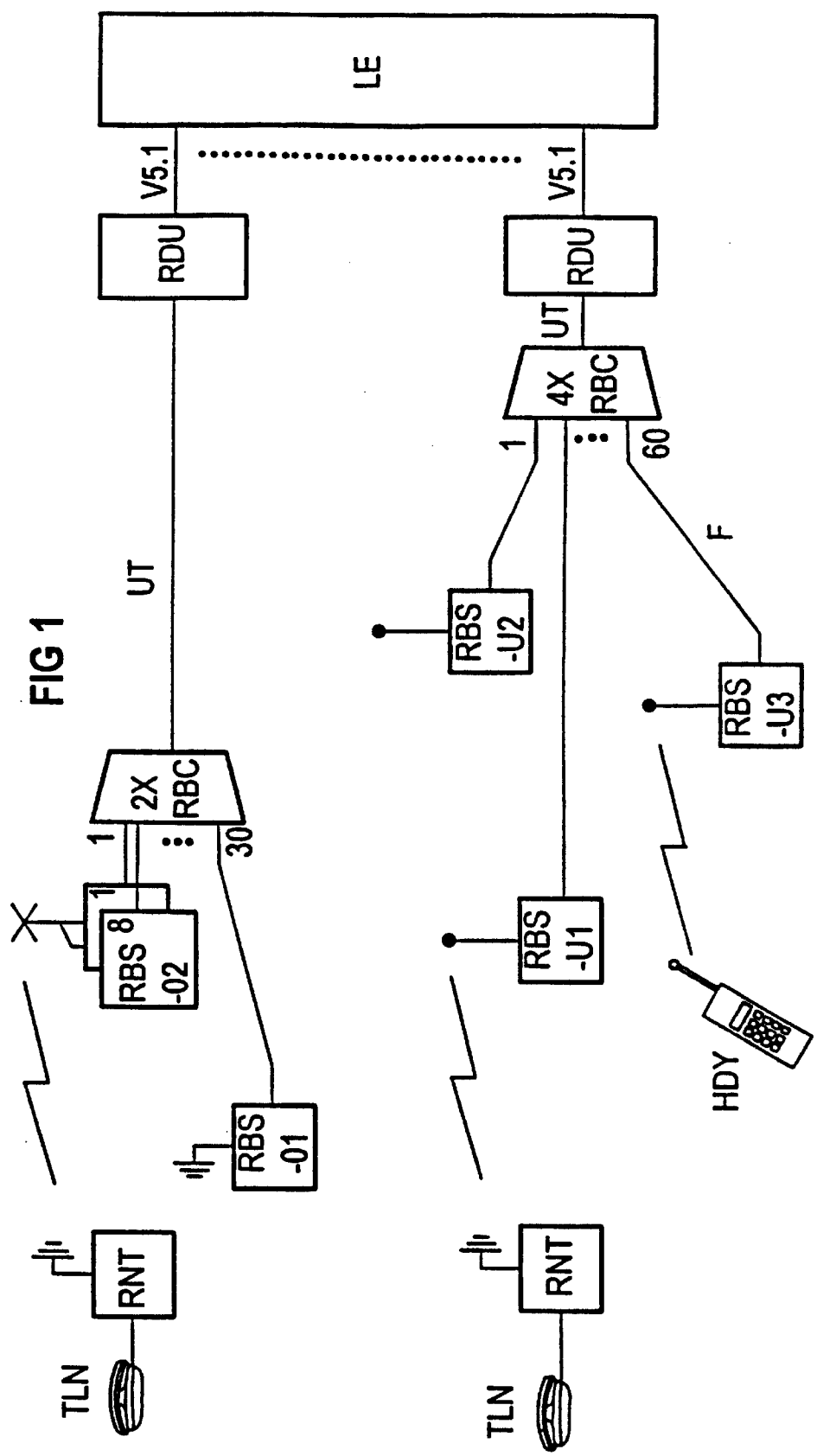
FIG. 1 shows the overview circuit diagram of a subscriber connection network in which the connection is implemented.

The subscriber connection network in accordance with FIG. 1 is used for connecting subscriber stations to a telecommunications switching office LE.

The subscriber stations can be fixed subscriber devices TLN which are connected in this case to subscriber connection units RNT, or else mobile subscriber terminals HDY. Between these subscriber connection units RNT, and between the mobile subscriber terminals HDY and radio base stations RBS, there is a radio system. The subscriber connection units RNT are equipped in this context with directional antennas. In this context, the radio base stations can have omnidirectional antennas, such as is illustrated in the radio base stations RBS-u1 to RBS-u3 illustrated in the lower part of the figure.

In particular for distance ranges which are greater than 1 km, the radio base stations also have omnidirectional antennas, as does the radio base station RBS-o1 illustrated in the upper part of the figure.

Preferably at distances which are less than 1 km, the radio base stations have sector antennas which cover only a sector of the service area, see one of the radio base stations RBS-o2 illustrated in the upper part of the figure. The use of such sector antennas instead of an antenna covering the entire service area enables multiple use to be made of a high percentage of the total number of radio frequencies available and/or of the radio channels formed with them, as a result of which better use is made of the radio frequency range available.

The radio base stations terminate the radio-specific procedures relating to the subscriber connection units RNT and/or to the mobile terminals HDY and form U interfaces on copper lines via which they are connected to units RBC which serve as muftiplexers for the information of a plurality of such connected radio control units RBS.

The units RBC can be arranged remotely from the switching office, i.e. at a distance of up to 4 km from the telecommunications switching office LE, see upper part of FIG. 1, or else be located in the vicinity of the switching office, see lower part of FIG. 1. They are connected via a transmission link UT to radio control units RDU arranged near to the switching office in every case. The transmission link UT, which in practice has a transmission bandwidth of 2 Mbit/s, can comprise copper lines, optical waveguides or a microwave radio link.

The radio control units RDU are used to control the connection network described thus far. They are connected to the telecommunications switching office LE via V5.1 interfaces or V5.2 interfaces and a plurality of copper lines. In practice, a relatively large number, for example 16, of such radio control units may be provided.

Figure 2:
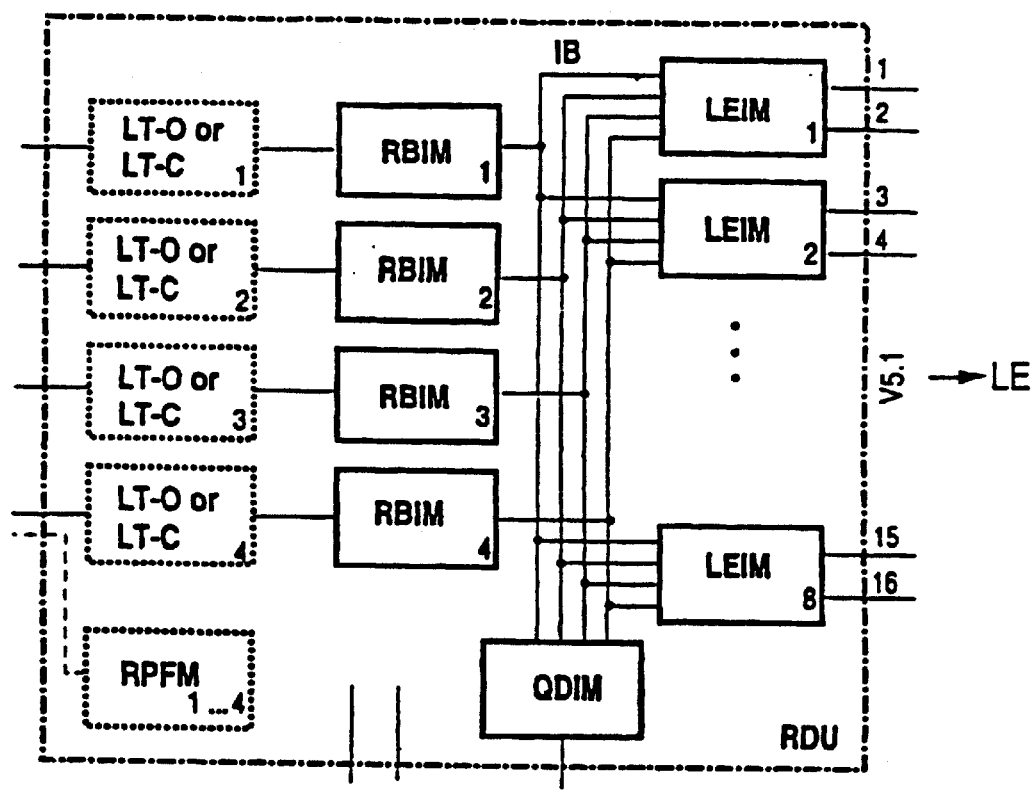
FIG. 2 shows the block circuit diagram of a radio control unit, constructed according to the invention, of such a connection network.

As is shown by FIG. 2, a radio control unit RDU which is designed according to the invention has on the switching office-side interface units LEIM1 to LEIM8, which are conceived as downtime units, for connecting a connection line which leads to the switching office LE. In the case of a minimum level of equipment, only one such interface unit is provided. In the case of a standalone, the database of these interface units contains the subscriber data of the entirety of the subscribers which can be reached via the subscriber connection network. In this case, between the interface unit LEIM and the switching office LE there is a line connection leading via a V5.2 interface. In the case of a line connection leading via a V5.1 interface, the subscriber data are distributed over a plurality of switching office-side interface units LEIM.

On the subscriber side, the radio control unit RDU in accordance with FIG. 2 has at least two interface units RBIM which are used to connect one of the abovementioned transmission links UT via which there is a connection to a unit RBC in each case and from which there is a connection to the radio base stations RBS which are connected thereto. The databases of the interface units RBIM contain the data of the respectively associated radio base stations RBS.

If the transmission links are implemented by means of copper lines or optical waveguides, they are connected to the radio control unit RDU via line terminating units RT-0 and/or LT-C.

A further component of the radio control unit RDU is an interface unit QDIM which is used to connect a system for operational and maintenance tasks. In the course of a configuration, the aforementioned subscriber data can be entered from this system into the database of the interface units LEIM and/or data of the radio base stations RBS can be entered into the database of the interface units RBIM.

In the case of an incoming seizure, i.e. one which originates from the switching office LE, of a subscriber, that switching office-side interface unit LEIM which contains the data of the respective subscriber in its database transmits a subscriber call to all the subscriber-side interface units RBIM which can be reached by the switching office-side interface unit by way of the corresponding bus connection, which subscriber call is passed on from there via the transmission link UT to the connected radio base stations RBS. The subscriber stations can thus receive a call from any one of these radio base stations which can be reached. In response they will transmit an acknowledgment signal via the respective radio base station RBS to the subscriber-side interface unit RBIM which is connected to this radio base station and which in response switches off the call signal and assigns to the subscriber station a traffic signaling channel and a signaling channel for establishing a connection.

If, in the course of an existing connection, the radio conditions between the subscriber connection unit RNT and the radio base station RBS drops below a prescribed value, a changeover to another channel of the plurality of channels which are routed via the same base station (intra-cell transfer) or to a radio channel which is being processed via another base station (inter-cell transfer) can be requested from the subscriber station. In the latter case, a subscriber-side interface unit RBIM other than the one via which the connection has been set up is then addressed. The interface unit mentioned first passes on the changeover request to all the switching-office-side interface units LEIM which can be reached from it. However, only that interface unit LEIM via which the connection is actively routed will react. In the case of a V5.2 interface this is the interface unit LEIM in which the data of the requesting subscriber terminal are stored. This interface unit will then bring about a switchover to the new radio base station RBS by transmitting an acknowledgment signal via the new connection path to the mobile subscriber terminal and, as soon as a confirmation of the switchover to the new radio channel has been received from there, clearing the original connection via the other radio base station. The connection path from the interface unit LEIM to the switching office LE remains unaffected during this process.

In the case of an outgoing seizure, i.e. one which originates from a subscriber station, said subscriber station emits a seizure message which is received by any one of a plurality of possible radio base stations RBS and is passed on via the respective transmission link UT to the assigned subscriber-side interface unit RBIM. From there, this seizure message passes, as in the case of the radio cell changeover described above, again to all the subscriber-side interface circuits LEIM which can be reached from this interface unit, of which interface circuits LEIM, however, only one, which has the data of the calling subscriber in its database, reacts to this. This takes place in the form of the transmission of an acknowledgment signal to the calling subscriber and the outputting of a seizure message to the switching office LE. In the case of a V5.1 interface, this is always that interface unit LEIM to which the calling subscriber is permanently assigned.

If, in the case of the subscriber connection network according to the invention, a switching-office-side interface unit LEIM of the radio control unit RDU fails, no more than the permitted number of subscribers is affected, by virtue of the fact that this interface unit is conceived as a downtime unit.

If a failure of a subscriber-side interface unit RBIM occurs, it is still possible to set up a connection at least for all the permanently connected subscriber stations, since, according to the invention, the subscriber connection units are installed in such a way that they can reach radio base stations which are connected to various subscriber-side interface units RBIM.

It is also conceivable that connections which exist for this reason can be saved in the event of the failure of such an interface unit RBIM. It is namely specified that if a transmission link UT fails, which will in fact occur even if the respective interface unit RBIM has failed, the unit RBC causes all the radio base stations connected to it to interrupt radio operation. The subscriber connection units RNT and/or the mobile subscriber terminals HDY react to this as to the previously treated degradation of the radio conditions, i.e. they request a free radio channel from another radio base station which they can reach, from which, in the case of success, the setup of a new connection path via another transmission link UT and another interface unit RBIM is initiated.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A subscriber connection network for connecting subscriber stations to a telecommunications switching office, comprising:

the network having a radio system for establishing connections, an air interface of the system being between fixed subscriber connection units for subscriber terminals and/or mobile terminals and radio base stations, each of the radio base units being configured to serve a plurality of subscriber terminals and connected, via a transmission link, to radio control units which are near a switching office, a subscriber terminal being connectable to the switching office via at least two of the radio base stations and being changeable to another radio base station without interruption during an existing connection;

each of the radio control units comprising;
  a) on a switching-office-side, at least one interface unit, which is a downtime unit, for connecting a connection line which leads to the switching office and whose database contains subscriber data;
  b) on a subscriber side, at least two interface units for connecting a transmission link, which connects to at least one base station and whose database contains data of a respective radio base station;
  c) an interface unit for connecting a system for operational and maintenance tasks; and
  d) a multiple bus system having at least two individual bus systems for connecting the interface units in accordance with features a) to c), interface units in accordance with feature b) having access to at least one of these individual bus systems, interface units in accordance with feature a) having access to at least two of these individual bus systems and an interface unit in accordance with feature c) having access to all of the individual bus systems, wherein, due to spatial arrangement of the radio base stations, at least two radio bus stations which are connected to a radio control unit via various transmission links are reached from one subscriber station.

2. The subscriber connection network as claimed in claim 1, wherein:
  a) when there is an incoming seizure, the subscriber call is passed on from the switching office-side interface unit to at least one group of subscriber-side interface units and thereafter to the radio base stations controlled by said subscriber-side interface units, as a result of which subscriber stations can receive a call from any of the respective radio base stations, in response to which the base stations output an acknowledgment signal to the respective transmitting interface (RBIM) which in response switches off the call signal and assigns the subscriber station a traffic channel and a signaling channel; and
  b) when there is an outgoing seizure, the seizure message which is emitted by a respective subscriber station is received by any radio base station and is passed on to the subscriber-side interface unit controlling the respective subscriber station, which interface unit transmits the seizure message to all the switching office-side interface units which can be reached, of which interface units a respective interface unit whose database the subscriber data of the calling subscriber stations are contained transmits an acknowledgment signal and passes on the seizure message to the switching office.

* * * * *